(12) United States Patent
Lendvay et al.

(10) Patent No.: US 8,245,702 B2
(45) Date of Patent: Aug. 21, 2012

(54) DOG BALL SHOOTING DEVICE

(76) Inventors: Lehel Jozsef Lendvay, San Diego, CA (US); Raymond Kuo-Sheng Lee, San Diego, CA (US)

( * ) Notice: Subject to any disclaimer, the term of this patent is extended or adjusted under 35 U.S.C. 154(b) by 502 days.

(21) Appl. No.: 12/500,569

(22) Filed: Jul. 9, 2009

(65) Prior Publication Data

US 2010/0018511 A1    Jan. 28, 2010

Related U.S. Application Data

(60) Provisional application No. 61/083,883, filed on Jul. 25, 2008.

(51) Int. Cl.
*A63B 65/12* (2006.01)
*A01K 15/02* (2006.01)
(52) U.S. Cl. ........................................................ 124/16
(58) Field of Classification Search .................... 124/16, 124/65; 119/207
See application file for complete search history.

(56) References Cited

U.S. PATENT DOCUMENTS

| | | | |
|---|---|---|---|
| 2,650,593 A * | 9/1953 | Weil et al. .................... 604/63 |
| 3,467,116 A * | 9/1969 | Ringewaldt .................. 294/100 |
| 3,527,492 A * | 9/1970 | Hollis ........................... 294/115 |
| 4,014,307 A | 3/1977 | Horvath |
| 4,241,716 A | 12/1980 | Tsui |
| 4,254,979 A | 3/1981 | Bau |
| 4,299,246 A * | 11/1981 | Marsh ............................. 135/66 |
| 4,811,750 A * | 3/1989 | McAllister ...................... 135/66 |
| 4,995,371 A | 2/1991 | Kuizinas |
| 5,619,977 A | 4/1997 | Gatin |
| 5,707,303 A * | 1/1998 | Berkowitz et al. ............ 473/386 |
| D425,593 S | 5/2000 | Kirch |
| D428,085 S | 7/2000 | Kirch |
| 6,338,685 B1 * | 1/2002 | Posluszny ..................... 473/386 |
| 6,408,836 B1 | 6/2002 | Ming-Hsien |
| 7,213,724 B1 | 5/2007 | Langer et al. |
| 2002/0137581 A1 | 9/2002 | Wang |
| 2005/0183710 A1 * | 8/2005 | Lapointe ......................... 124/65 |

* cited by examiner

*Primary Examiner* — Kurt Fernstrom
*Assistant Examiner* — Amir Klayman
(74) *Attorney, Agent, or Firm* — George S. Levy

(57) ABSTRACT

This device is designed to shoot balls and can be used to play with dogs. It comprises a handle, an upper tube attached to the handle, a trigger mechanism, a lower tube slidably mounted against a mechanical energy storage device such as a metal spring, a rubber band or compressed air in the upper tube, and a gripping mechanism mounted in the lower end of the lower tube. The gripping mechanism is designed to grab the ball when the device handle is pushed down and to release the ball when the trigger is pulled and the lower tube is extended outward by the force of the spring causing the ball to fly away.

8 Claims, 24 Drawing Sheets

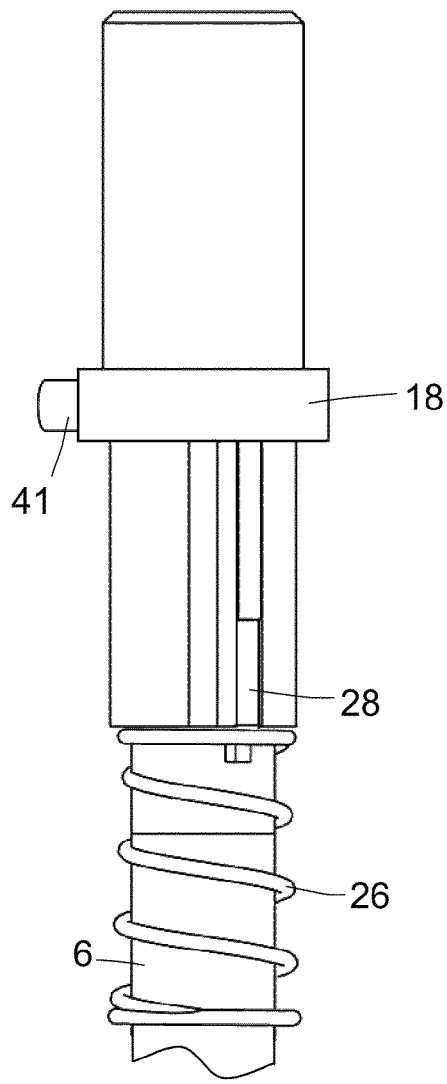
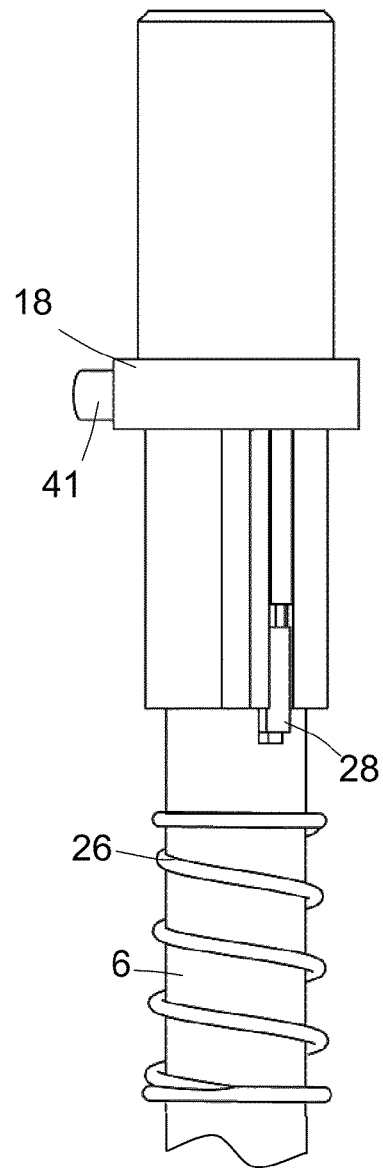
FIG 14A
FIG 14B

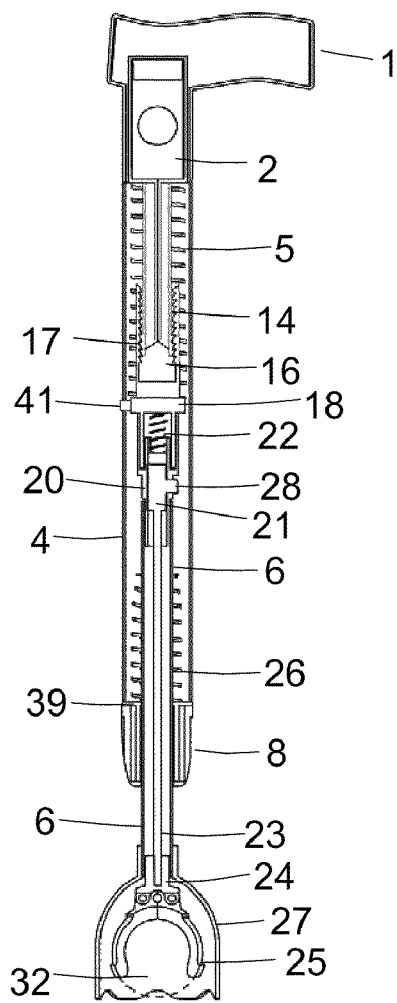
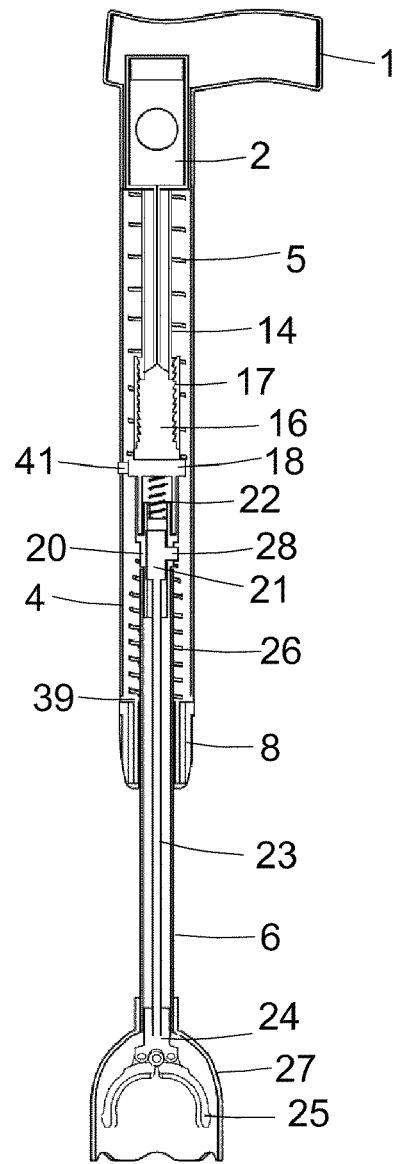
FIG. 16
FIG. 16A

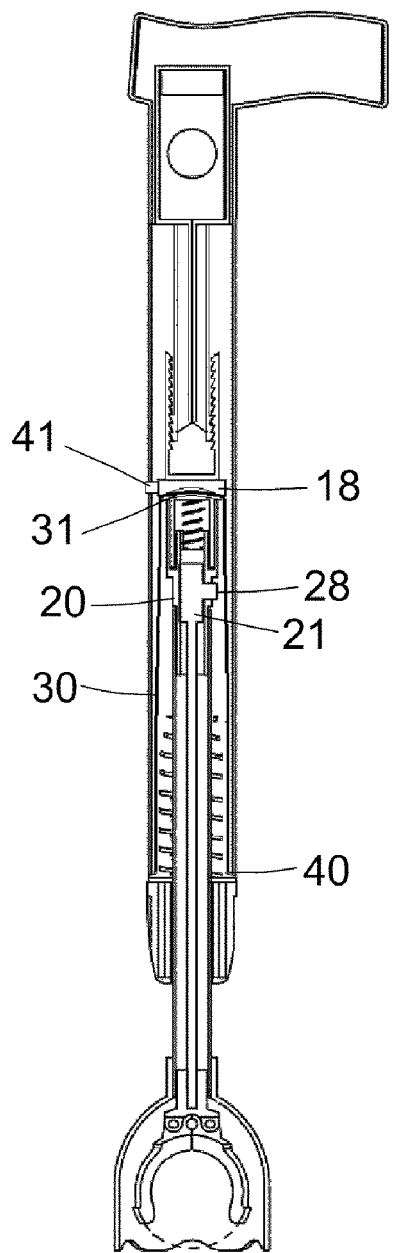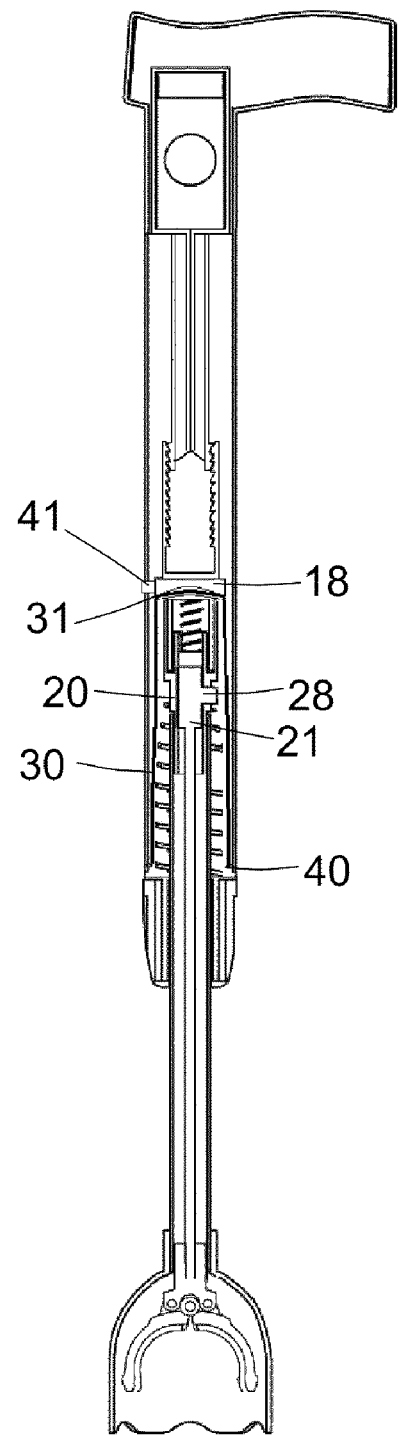
FIG. 19
FIG. 19A

DOG BALL SHOOTING DEVICE

FIELD OF THE INVENTION

This invention claims the benefit of U.S. Provisional Application No. 61/083,883 with the title, "Dog Ball Shooting Device" filed on Jul. 25, 2008 and which is hereby incorporated by reference. Applicant claims priority pursuant to 35 U.S.C. Par 119(e)(i). The present invention relates to devices for throwing and scooping up balls. It also relates to toys for dogs.

BACKGROUND

Playing "fetch the ball" with a dog can be a physically demanding task. To make the game more interesting the ball should be thrown a great distance. When the dog brings it back, the ball is usually covered with slimy dog saliva. It must be picked up from the ground and thrown again. Several patents describe ball throwing devices, however none of them provides the advantages of this invention.

U.S. Pat. No. 4,135,750 by Rosin is a device for scooping up dog feces. It cannot be used to throw a ball.

U.S. Pat. No. 4,241,716 by Kwok describes a ping pong ball throwing gun. This invention is limited to shooting ping-pong balls. It cannot be used to pick up balls from the floor. It relates to scooping up various types of refuse, especially animal waste, and other objects such as a ball. This device however cannot shoot balls.

U.S. Pat. No. 4,254,979 by Bau is mainly a scoop device. It can only throw a ball only by swinging the handle and manually releasing the ball from its grip.

U.S. Pat. No. 7,213,724 by Langer is a ping-pong ball throwing device. It cannot be used to pick up balls from the floor.

US patent application 2002/0137581 by Wang is a baseball equipped with a mechanism for throwing balls. It is not equipped for picking up balls from the floor.

U.S. Pat. Des. 425,593 and Des. 428,085 describe a pet ball scoop handle. This invention however is impractical to pick up a ball. In addition, throwing the ball requires the user to swing his arm resulting in an inaccurate aim.

None of the prior art offers the functionality, utility, simplicity and economy of use of this invention. Further features, aspects, and advantages of the present invention over the prior art will be more fully understood when considered with respect to the following detailed description claims and accompanying drawings.

BRIEF DESCRIPTION OF THE DRAWINGS

FIG. 14A is a side view of the gripper trigger mechanism in the cocked state.

FIG. 14B is a side view of the gripper trigger mechanism in the released state.

FIG. 16 is a cross sectional view of the invention in the armed state.

FIG. 16A is a cross sectional view of the invention in the unarmed state.

FIG. 19 illustrates the device in an armed state, in which the main spring has been replaced by a rubber band.

FIG. 19A illustrates the device in an unarmed state, in which the main spring has been replaced by a rubber band.

SUMMARY OF THE INVENTION

The Dog Ball Shooting device is designed to help the dog owner who would like to play fetch with his/her dog cleanly and easily. This means that the potentially slimy ball does not have to be touched by hand and there is no need to bend down to pick up and throw the ball. All the user needs to do is to place the end of the device over the ball, push down the handle, then aim and pull the trigger. This can be achieved with one continuous nearly effortless movement.

Figure 1:
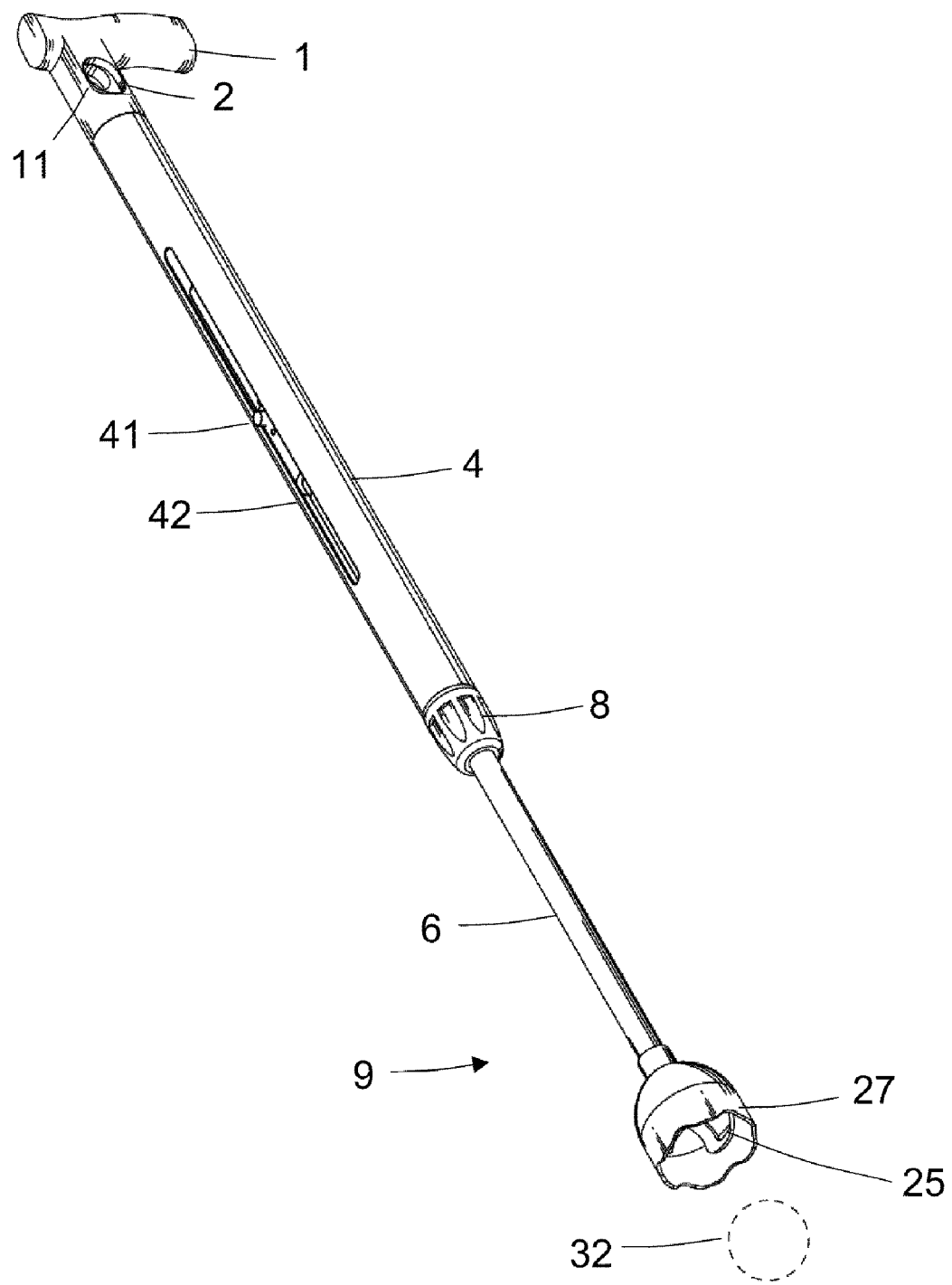
FIG. 1 illustrates the whole invention of the dog ball shooting device.

The device shown in FIG. 1 is shaped and sized like a walking cane with a gripping apparatus at its bottom. The handle looks like the handle of a normal walking cane, and it can also be used as such. Close to the middle section of the device has an adjusting knob. Tightening this knob prevents the device from being pushed down. In this state it can be used as a walking cane. It can be leaned on for support and it will not collapse or wobble. The device is light weight and durable. It is designed to allow years of usage from hot summer, to rainy and cold winter conditions.

The device comprises a handle. A hollow chamber, called the trigger cavity located inside this handle, contains a trigger plate. Openings on the side of the handle allow the user to reach the trigger plate and to slide it up or down within the handle cavity. The handle is attached to a first tube called the upper tube, by means of the tube end cap which is annular. A second tube, called the lower tube is slidably mounted inside the upper tube and terminates at its upper end by a second end cap.

A mechanical storage device in the form of a spring for example, henceforth called the main spring, is located inside the upper tube between the upper tube end cap and the lower tube end cap. This spring, when released from its compressed state, provides the propulsion fore to the ball. A trigger ratchet mechanism is used to control the release of the main spring. It comprises a ratchet fork fitting inside a ratchet tube. The ratchet fork is attached at its base to the upper tube end cap. It is made of flexible material and carries on the external surface of its tines, serrated teeth. The ratchet tube carries serrated teeth on its inside surface. The separation of the tine of the ratchet fork is controlled by a tension wire which has an inverted Y configuration such that the trunk of the Y is on top and is connected to the trigger through the annular opening in the upper tube end cap, and each branch of the Y is connected at the bottom to said the tines of the fork, such that tension applied on the tension wire causes the ratchet fork to separate from the ratchet tube and release the ratchet.

A lock knob is attached to lower end of the upper tube to exert, at the option of the user, a pressure on the lower tube allowing the device to be used either as a ball launcher or as a walking cane.

The device also comprises a gripping apparatus attached to the lower end of the lower tube. This gripping apparatus comprises a gripper slide, a gripper trigger, a gripper rod, a gripper articulation, gripper arms, a buffer spring, a gripper shroud and a gripper spring.

The gripper slide is mostly tubular in shape and is anchored at its upper end to the lower tube end cap.

The gripper trigger is mostly cylindrical in shape and fits inside the gripper slide. The gripper trigger is equipped on its side with a protuberance which projects through an opening in the gripper slide.

The gripper rod is embedded at its upper part in the gripper trigger, and is capable of sliding up or down relative to the lower tube.

The gripper articulation is affixed at its upper end to the gripper rod, and to the lower tube. The gripper articulation provides leverage as a function of the position of the gripper rod with respect to the lower tube.

The gripper arms are attached to the gripper articulation. The position of the gripper arms is dependent of the leverage provided by the gripper articulation.

The buffer spring is configured to absorb the shock of the lower tube as well as to press upward against the protuberance in the gripper trigger when the lower tube moves downward.

The gripper shroud surrounds and protects the gripper arms.

The gripper spring is located between the lower tube end cap and the gripper trigger. The gripper spring pushes down on the gripper rod that in turn pushes down on the gripper arms thus forcing the grippers arms to close and to hold the ball, except when the lower tube is slid outward such that the protuberance in the gripper trigger makes contact with the buffer spring. In this case the force exerted by the buffer spring on the protuberance is communicated to the gripper rod and counters the force exerted by the gripper spring, thereby forcing the gripper arms to open and release the ball.

An alternative design involves the use of an elastic band to replace the main spring as a mechanical storage device. In contrast with the spring, the rubber band in a stretched state corresponds to the spring in a compressed state, and the rubber band in a contracted state corresponds to the spring in a released state.

Yet another alternative design is to use compressed air in lieu of the main spring.

DETAILED DESCRIPTION

This invention is illustrated in FIG. 1. It is approximately in the shape of a walking cane and essentially consists of the following parts:
a) Handle 1,
b) Trigger 2,
c) Safety lock Bar 3,
d) Upper tube 4,
e) Main spring 5,
f) Lower tube 6,
g) Trigger ratchet mechanism 7,
h) Lock knob 8, and
i) Gripping apparatus 9.

Each part will be described in detail along with the integration and interaction with other parts and modules.

Handle

Figure 2:
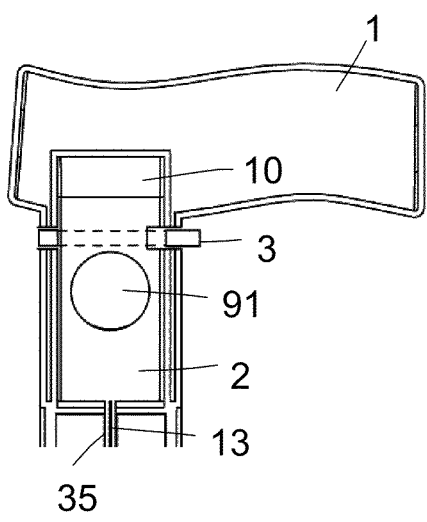
FIG. 2 is a cross-section view of the handle showing the trigger and the safety bar in the unlocked mode.
Figure 2A:
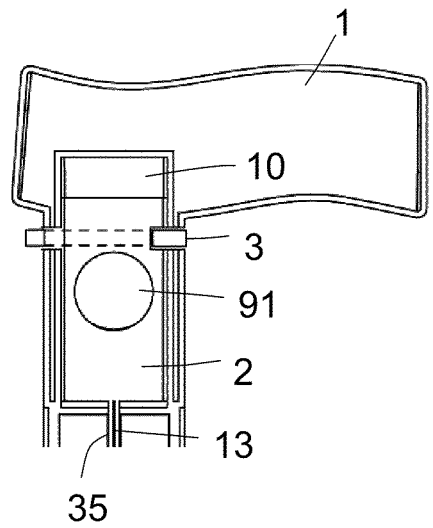
FIG. 2A is a cross-section of the handle showing the trigger and the safety bar in the locked mode.

The handle 1 illustrated in cross-section in FIG. 2 and FIG. 2A. It is shaped like the handle 1 of a normal walking cane allowing easy and convenient holding of the device. The handle 1 is firmly affixed to the upper end of the upper tube 4. In addition, the handle 1 is hollow forming a cavity called the trigger slide chamber 10 that contains the trigger 2. The trigger slide chamber 10 is equipped on its sides with openings 11 through which the trigger 2 can be reached and pulled by the user's finger.

Trigger

The trigger 2 also shown in FIG. 2 and FIG. 2A is approximately a rectangular plate equipped on its side with a hole 91 through which the finger of the user can fit to exercise a pulling force. The trigger 2 fits and can slide inside the trigger slide chamber 10 in the handle 1.

Safety Lock Bar

Figure 3:
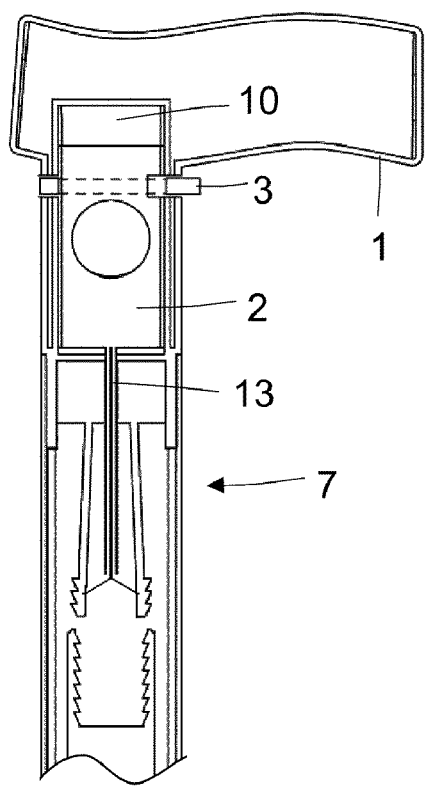
FIG. 3 is a cross-section of the trigger mechanism showing the safety lock bar in the unlocked safety position setting.
Figure 3A:
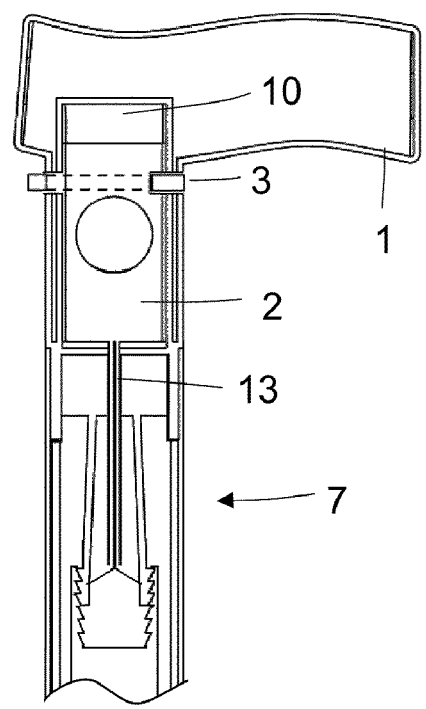
FIG. 3A is a cross-section of the trigger mechanism showing the safety lock bar inserted in the locked safety setting.

The safety lock bar 3 is shown in FIG. 3 and FIG. 3A. It is a peg that traverses the trigger 2 and the trigger slide chamber 10. Openings are configured in the trigger slide chamber 10 and in the trigger 2 to allow the passage of the safety lock bar 3 which is designed to prevent accidental firing of the device. When the safety lock bar 3 is pressed in, from under the handle 1, as shown in FIG. 3A, it slides in place and locks the trigger 2 to prevent it from moving. When the device is to be fired, the safety lock bar 3 must be pressed in from the other side to unlock the trigger 2 as shown in FIG. 3.

The trigger 2 is connected at its lower end to the trigger wire 13 which branches in an inverted Y shape at its lower end. This shape allows it to convert the vertical tension exerted on the trigger 2 by the user, to a horizontal force applied to the trigger ratchet mechanism 7.

As an option, a tension wire tube 35 could be employed to enclose and protect the trigger wire 13. Several possible shapes for the wire tube 35 are possible. For example it may be cylindrical to enclose only the upper part of the trigger wire 13 or it could have an inverted cylindrical Y shape such as to also enclose the lower part of the trigger wire 13. The upper part of the tension wire tube would be anchored to the upper tube end cap 34.

Upper Tube

The upper tube 4 is attached at its upper end to the handle 1 and contains the fixed part of the trigger ratchet mechanism 7 and the main spring 5 in which energy is stored to propel the ball 32. The upper tube 4 contains at its lower end the lock knob 8 that when tightened prevents the lower tube 6 from moving inside the upper tube 4.

Lower Tube

The lower tube 6 slides insides the upper tube 4 and is terminated at its upper end by the movable part of the trigger ratchet mechanism 7 and at its lower end by the gripping apparatus. When the device is held by the handle 1 and placed with its lower end on the ground and the handle 1 is pressed downward, the lower tube 6 is forced inside the upper tube 4 thereby compressing the main spring 5. The lower tube 6 together with the trigger ratchet mechanism 7 and the gripping mechanism form the lower tube assembly 33.

Trigger Ratchet Mechanism

Figure 4:
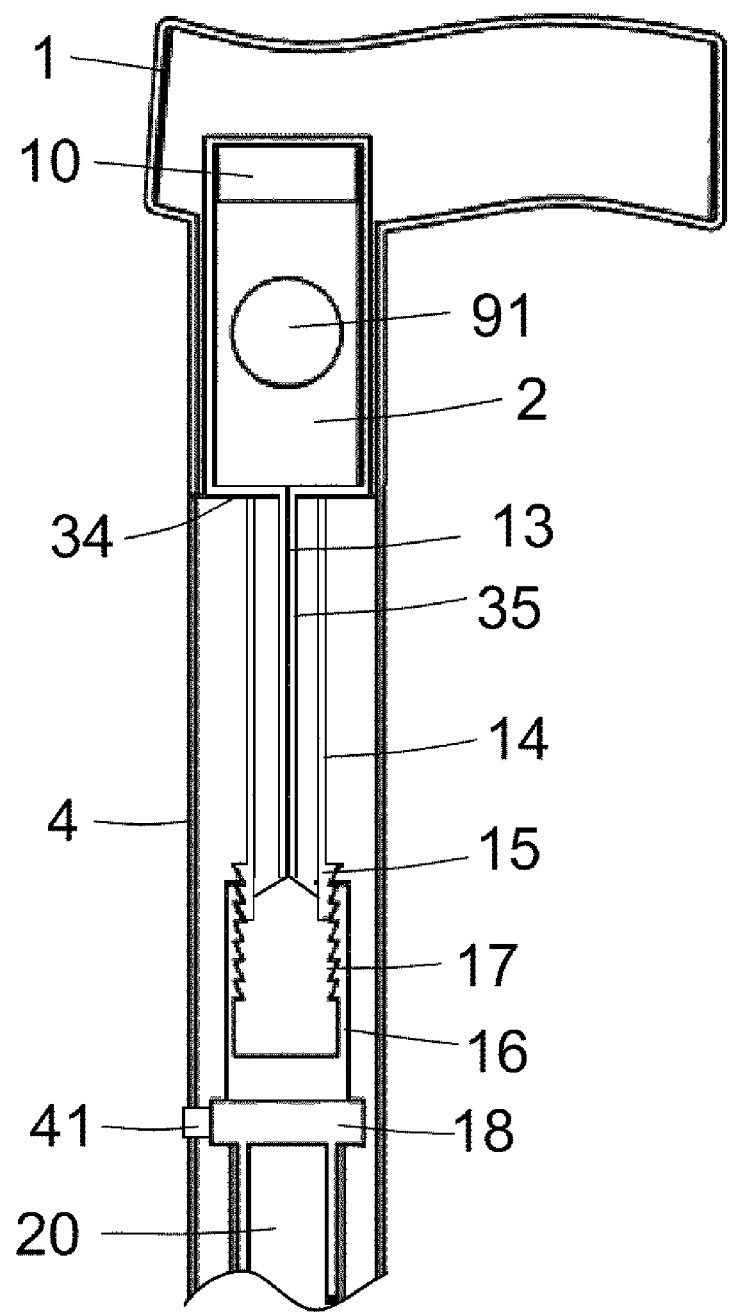
FIG. 4 illustrates the trigger mechanism.
Figure 5:
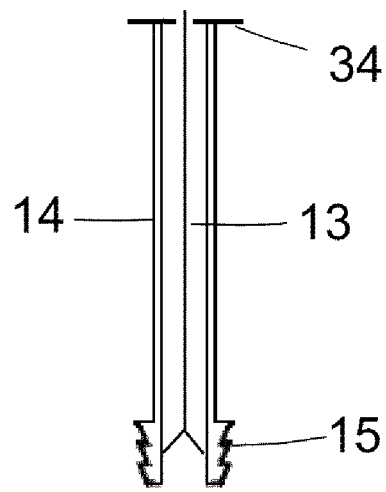
FIG. 5 shows the top part of the trigger mechanism which comprises the serrated fork.

The trigger ratchet mechanism 7 is illustrated in FIG. 4 and FIG. 5. It is connected to the trigger 2 by the trigger wire 13. This wire has an inverted Y-shaped lower end and transmits to the trigger ratchet mechanism 7 the tension exerted by the user on the trigger 2. The trigger ratchet mechanism 7 comprises a fixed part and a movable part.

Fixed Part of the Ratchet

The fixed part of the ratchet shown in FIG. 5 is called the serrated fork 14. It essentially consists of a fork-like structure firmly attached to the upper tube 4 upper end cap 34. This fork structure has serrated teeth 15 on the outside of its tines or branches. The fork structure is made of hard flexible material such that the spread between the branches of the fork can be controlled by the tension exercised by the trigger wire 13.

Movable Part of the Ratchet

Figure 5A:
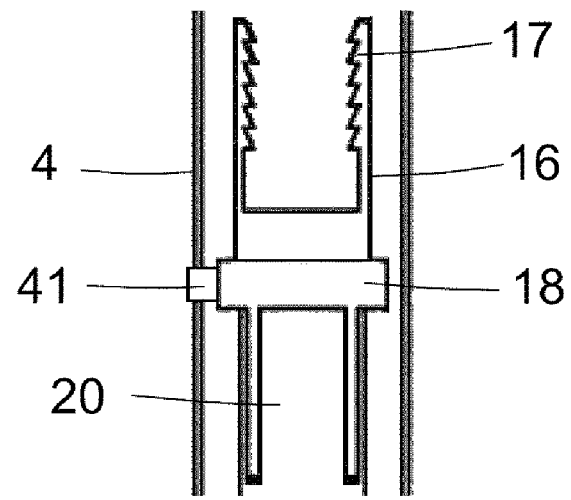
FIG. 5A shows the bottom part of the trigger mechanism which comprises the serrated tube.
Figure 6:
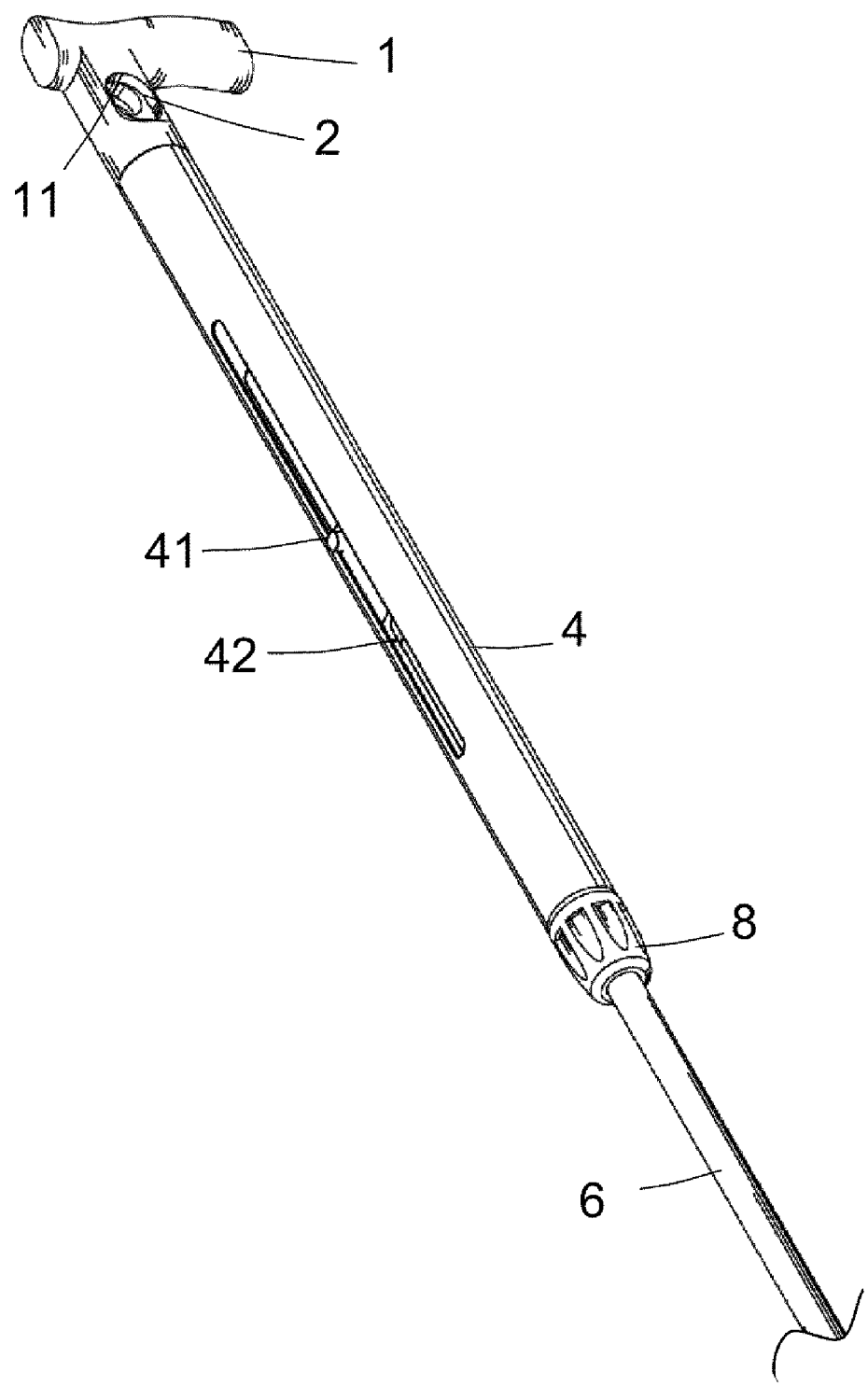
FIG. 6 illustrates the top portion of the invention, which includes the handle and the upper tube.

At its upper end, the movable part of the ratchet shown in FIG. 5A is called the serrated tube 16. It essentially consists of a tube serrated on the inside. This serrated tube 16 fits over the fork structure 14 such that the two sets of teeth produce a ratchet action which can be enabled or disabled by varying the tension of the trigger wire 13. When the trigger 2 is not pulled and consequently, the wire is not under tension, the teeth 15 on the fork branches 14 press against the teeth 17 on the inside of the tube 16 and the ratchet is enabled, thus preventing the main spring to propel the lower tube assembly 6 outward.

When the trigger 2 is pulled, the wire 13 is under tension thus pulling the fork branches 14 together, disabling the ratchet, and allowing the tube 16 to slide downward propelled by the main spring 5. As shall be explained below, this action results in the launching of the ball 32.

At its lower end, the movable part of the ratchet is affixed to, and forms an end cap 18 for, the upper end of the lower tube 6.

Main Spring

Figure 7:
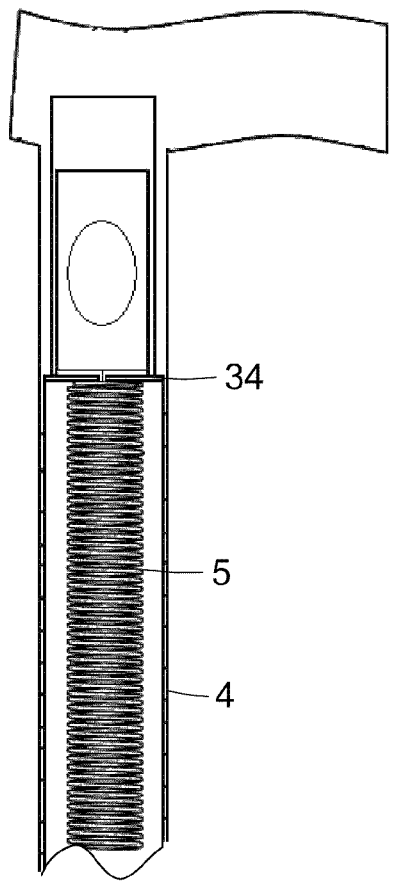
FIG. 7 is a cross section of the trigger mechanism that shows the main spring in a compressed state.
Figure 7A:
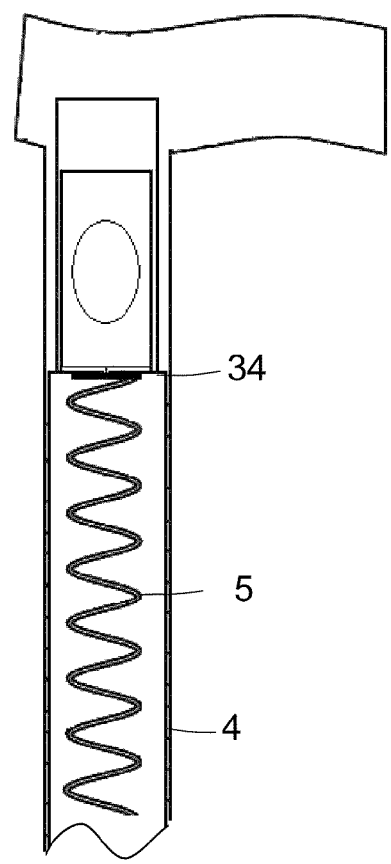
FIG. 7A is a cross section of the trigger mechanism that shows the main spring in a decompressed state.
Figure 8:
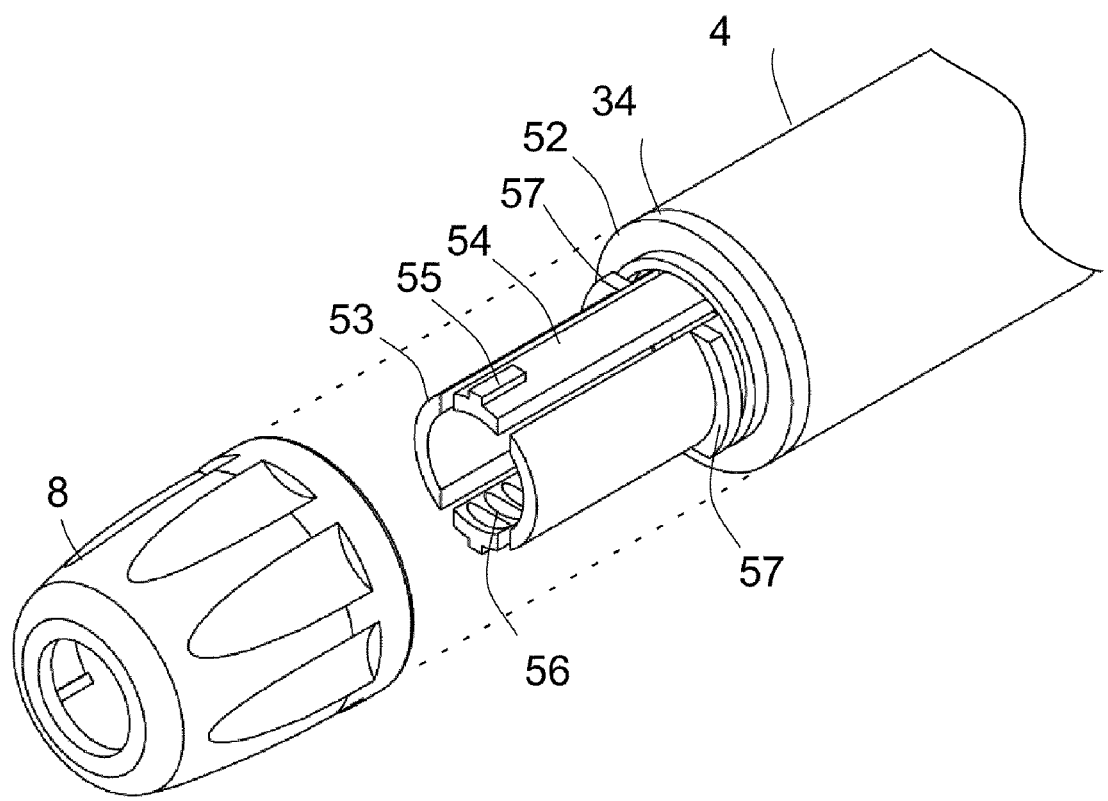
FIG. 8 illustrates how the lock knob fit over the lower part of the upper tube.
Figure 9:
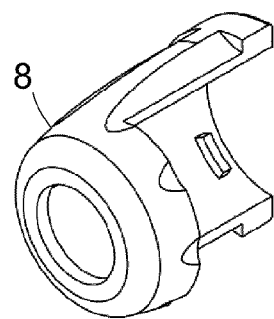
FIG. 9 provides a cut away view of the lock knob as viewed from the outside.
Figure 9A:
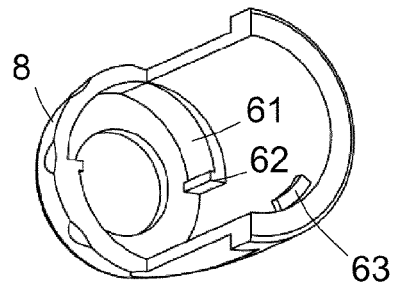
FIG. 9A provides a cut away view of the inside of the lock knob.
Figure 9B:
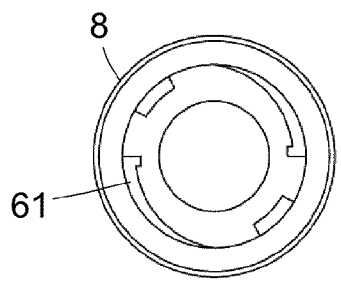
FIG. 9B is an end view of the lock knob showing the clamping ramp.
Figure 9C:
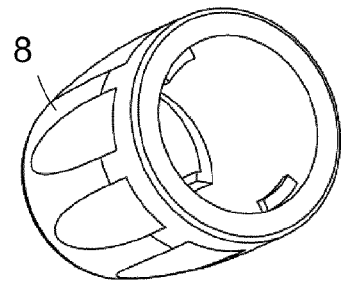
FIG. 9C is a view of the back of the lock knob.
Figure 10:
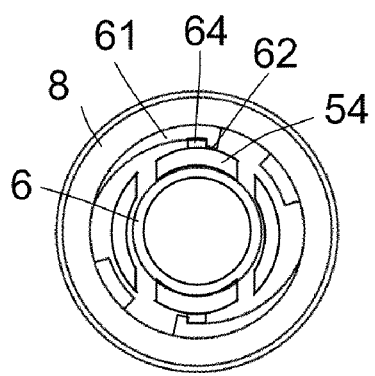
FIG. 10 is a transaxial cross sectional view of the lock knob and the lower tube showing the lock knob in a locked state.
Figure 10A:
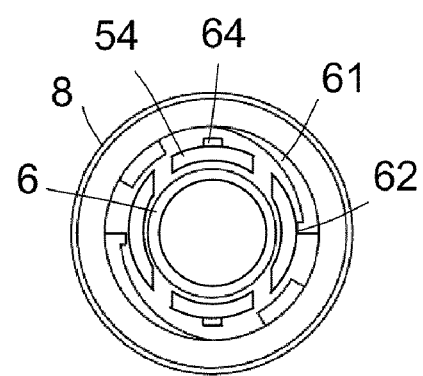
FIG. 10A is a transaxial cross-sectional view of the lock knob and the lower tube showing the lock knob in an unlocked state.

The main spring 5 shown in FIGS. 7 and 7A is located within the upper tube 4 and fits over the trigger ratchet mechanism 7. It holds the energy required to launch the ball 32. The upper end of this spring presses against the upper tube 4 upper end cap 34. Its lower end presses against a lip 19 formed around the bottom of the movable part of the trigger ratchet mechanism 7. FIG. 7 shows the main spring 5 in a compressed state and FIG. 7A shows the main spring 5 in an uncompressed state.

Lock Knob

The lock knob described in FIG. 8, FIG. 9, FIG. 9A, FIG. 9B, FIG. 9C, FIG. 10 and FIG. 10A. The function of the lock knob 8 is to prevent the lower tube 6 from moving inside the upper tube 4 and, optionally, to lock the lower tube 6 in place in relation to the upper tube 4, thus transforming the invention into a walking cane.

When the lock knob 8 is twisted counterclockwise the clamping ramp 61 compresses down the flexible arm 54 of the upper tube end cap 34. The rotation of the lock knob is stopped when a first protuberance 62 on the ramp called the ramp stop makes contact with a second protuberance 64, called the arm stop on the flexible arm 54. In this state, the grip teeth 56 located on the inner surface of the support tube are firmly pressing on the lower tube body 6, keeping it from moving, thereby transforming the invention into a walking cane. The support tube is attached to the retaining wall 52 which is itself attached to the upper tube 4.

The lock knob part remains on the upper tube end cap 34 by means of the guide tabs 63 positioned behind the retaining walls 52 located on the support tube 53. The upper tube end cap 34 is inserted into the upper tube 4 until it stops at the wall 52 and is secured to the upper tube by a fastening mechanism such as screws or snaps built into the inside surface of the knob cap and the lower outside surface of the upper tube.

Rotating the lock knob 8 clockwise releases the lower tube 6 from its grip allowing the invention to operate as a dog ball shooter.

Guiding Pin and Slot.

As shown in FIGS. 1, 6, 16, 16A, 17, 18, 19, 19A, and 20, the end cap 18 of the lower tube 6 forms a guiding pin 41 that extends slightly outward through a guiding slot 42 cut on the surface of the upper tube 4. This guiding pin allows the lower tube 6 to slide up and down without rotating inside the upper tube 6.

Gripping Apparatus

The gripping apparatus is shown in FIGS. 11, 12, 13, 13A, 13B, 13C, 14, 14A, 14B and 15. It comprises the following components:

a) Upper end cap 18 for the lower tube 6.
b) Gripper slide 20.
c) Gripper trigger 21.
d) Gripper spring 22.
e) Gripper rod 23.
f) Gripper articulation 24.
g) Gripper arms 25.
h) Buffer spring 26.
i) Gripper shroud 27.

End Cap for Lower Tube

Figure 11:
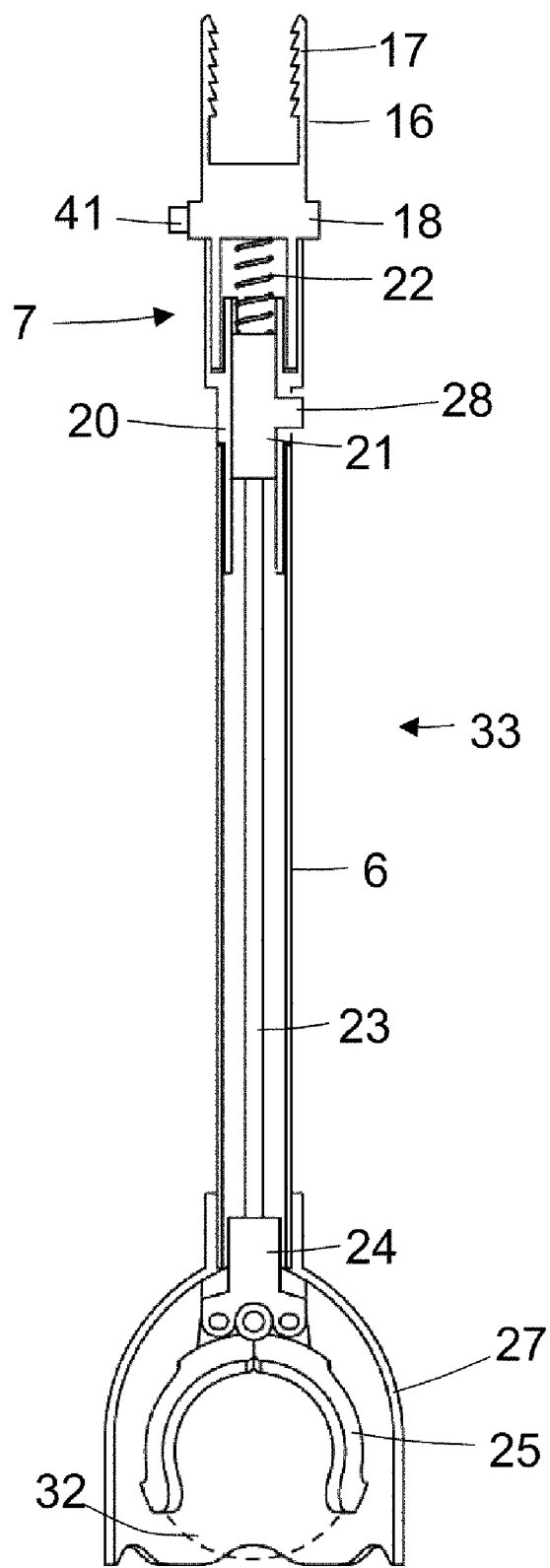
FIG. 11 is a cross sectional view of the lower portion of the invention showing the bottom part of the trigger mechanism with the serrated tube, the lower tube and the gripping mechanism.

As shown in FIG. 11, the bottom part of the trigger ratchet mechanism 7 forms the end cap 18 for the lower tube. It also provides an anchor for the gripper slide 20.

Gripper Slide

Figure 12:
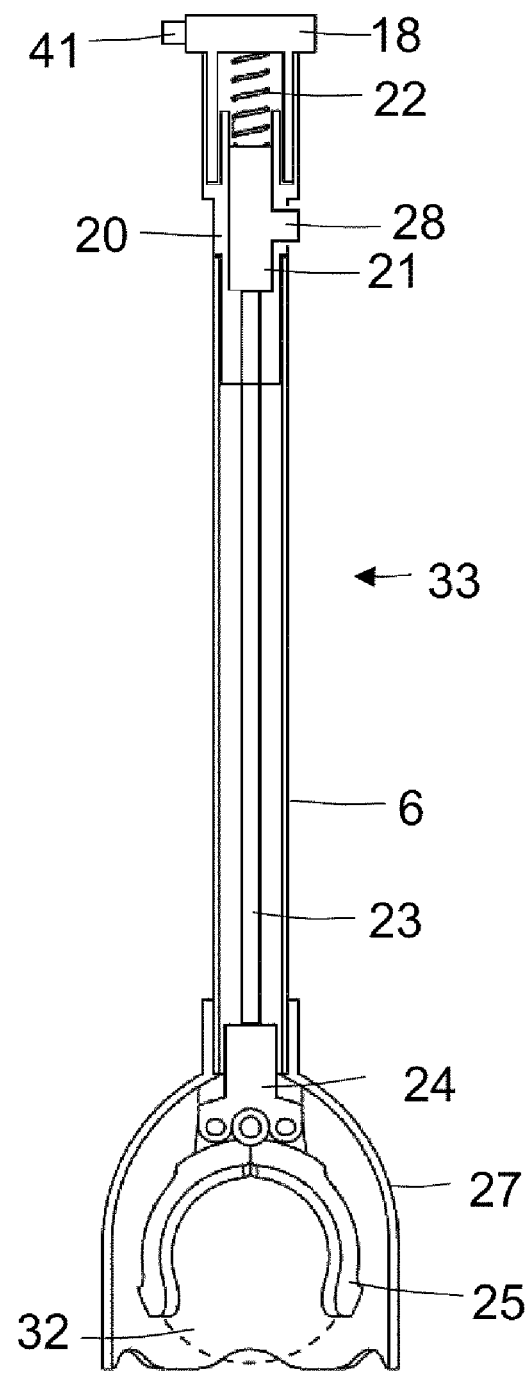
FIG. 12 is a cross sectional view of the lower portion of the invention showing the lower tube and the gripper mechanism.

As illustrated in FIG. 12, the end cap 18 is attached to the gripper slide 20 (for example by screwing or clicking into each other). Together they form a tubular structure closed at the upper end, which fits on, and is firmly affixed to, the top of the lower tube 6.

Gripper Trigger

The gripper trigger 21 is illustrated in FIGS. 13, 13A, 13B, 13C. 14, 14A, 14B, and 14C. It fits inside the gripper slide. It is essentially a cylindrical bar equipped on its side with a protuberance 28 that projects through an opening 28 in the gripper slide 20. This opening 28 is long enough to allow the gripper trigger 21 to move up and down.

Gripper Spring

As shown in FIG. 11 and FIG. 12, at its upper end, the gripper trigger 21 makes contact with the gripper spring 22 which is compressed against the inside top end of the gripper slide 20. In its relaxed state the gripper spring 22 is extended and the gripper trigger 21 is pushed as far down as possible such that the protuberance 28 is shifted to the bottom of the opening 29 in the gripper slide 20.

Gripper Rod

Figure 13:
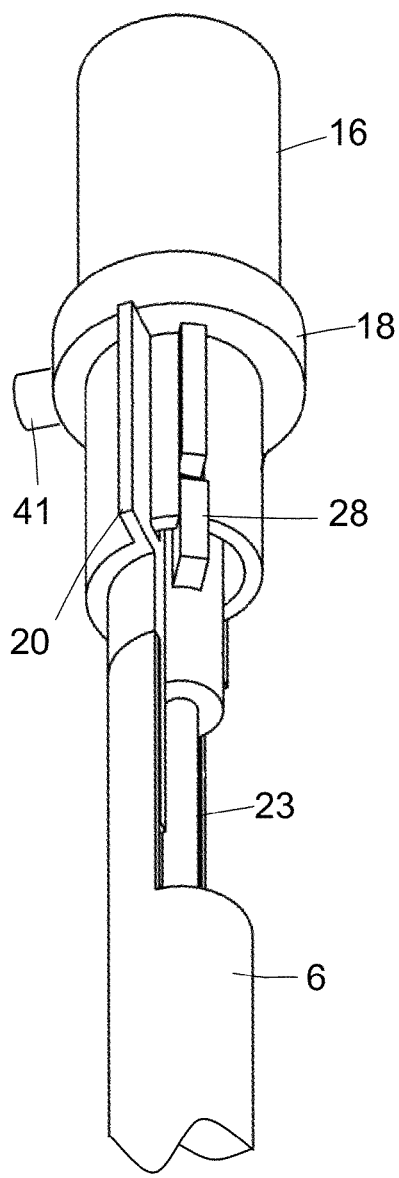
FIG. 13 is a cut away view of the gripper trigger mechanism.
Figure 13A:
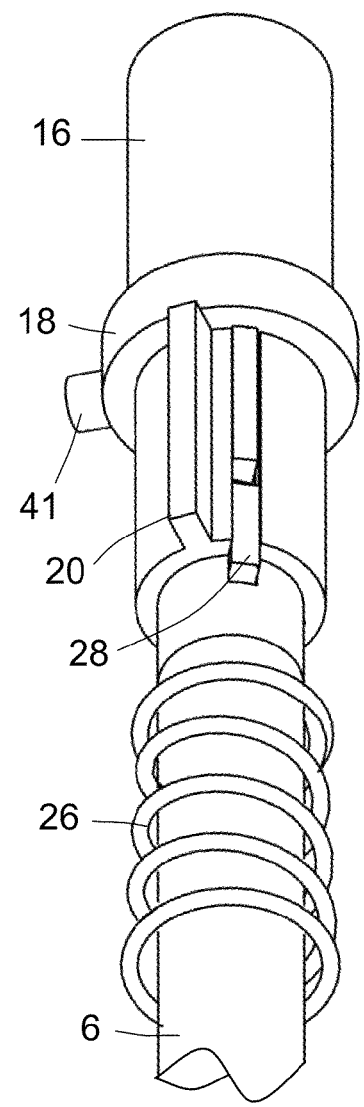
FIG. 13A is a perspective view of the gripper trigger mechanism.
Figure 15:
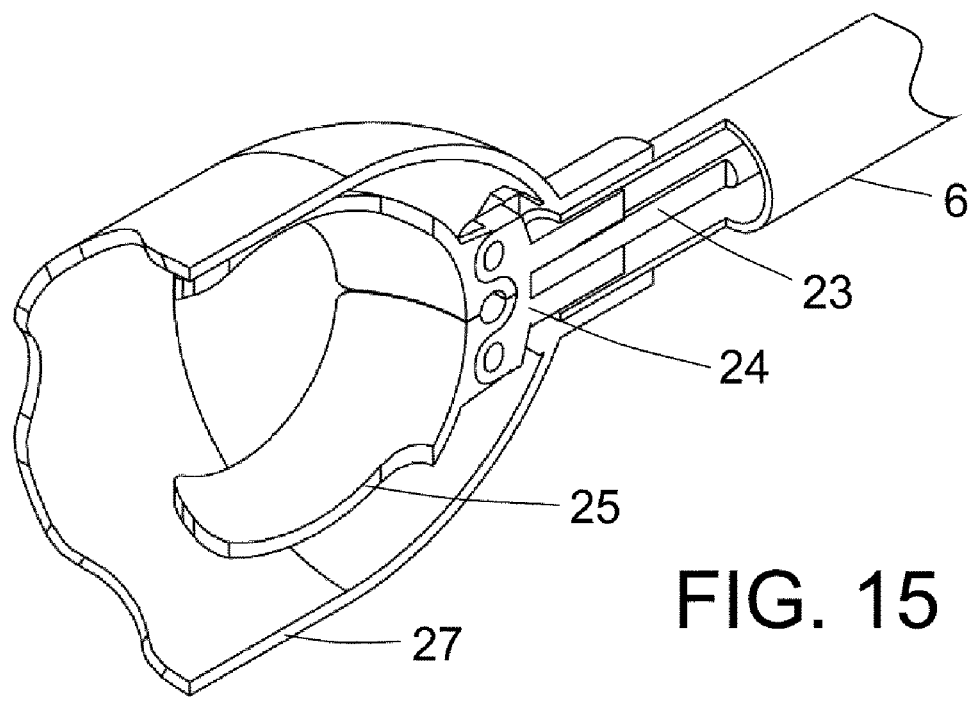
FIG. 15 is a cut away, cross sectional view of the lower end of the invention, showing the gripping mechanism including the gripping arms and the shroud.

The gripper rod 23 is shown in FIG. 13, FIG. 15. It is embedded at its upper end into the gripper trigger 21. The rod 23 extends downward to the gripper articulation 24. The rod 23 can move up or down relative to the lower tube thus controlling the operation of the gripper articulation 24.

Gripper Articulation

Figure 15A:
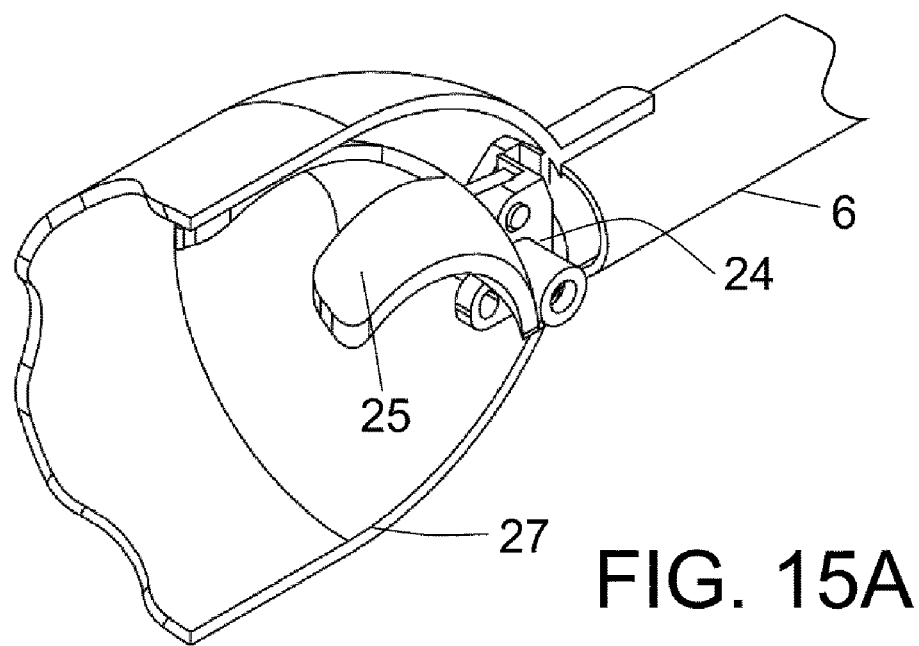
FIG. 15A is a cut away view of the lower end of the invention, showing the gripping mechanism including the gripping arms and the shroud.

The gripper articulation 24 illustrated in FIGS. 15 and 15A provides the leveraging action that controls the gripping arms 25. When the gripper rod 23 is pushed down with respect the lower tube 6, the arms 25 are moved to the closed position. When the rod is pushed up, they are moved to the open position.

Gripper Arms

The gripper arms 25 shown in FIGS. 15 and 15A are attached to the gripper articulation 24 and move in accordance to the motion of the gripper rod 23. In the uncompressed position of the gripper spring 22, the gripper rod 23 is pushed down and forces the gripper arms 25 to assume the closed position. The gripper arms 25 open only if a sufficient force is applied to push the rod 23 upward with respect to the lower tube 6, against the gripper spring 22.

Figure 13B:
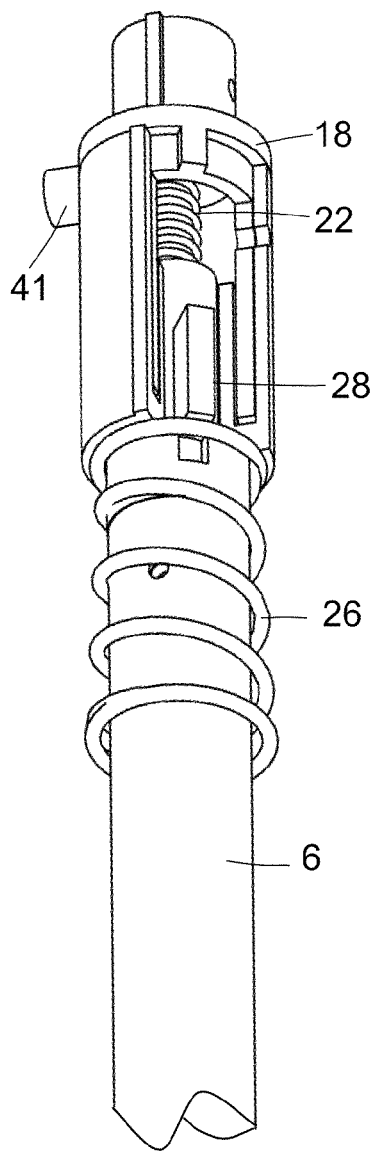
FIG. 13B is a perspective cut-up view of the gripper trigger mechanism in the cocked state.
Figure 13C:
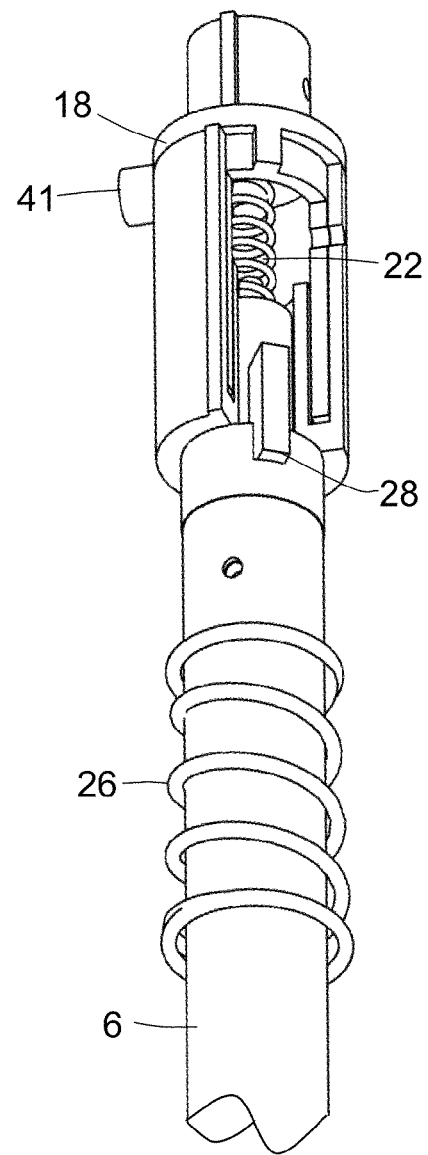
FIG. 13C is a perspective cut-up view of the gripper trigger mechanism in the released state.
Figure 14:
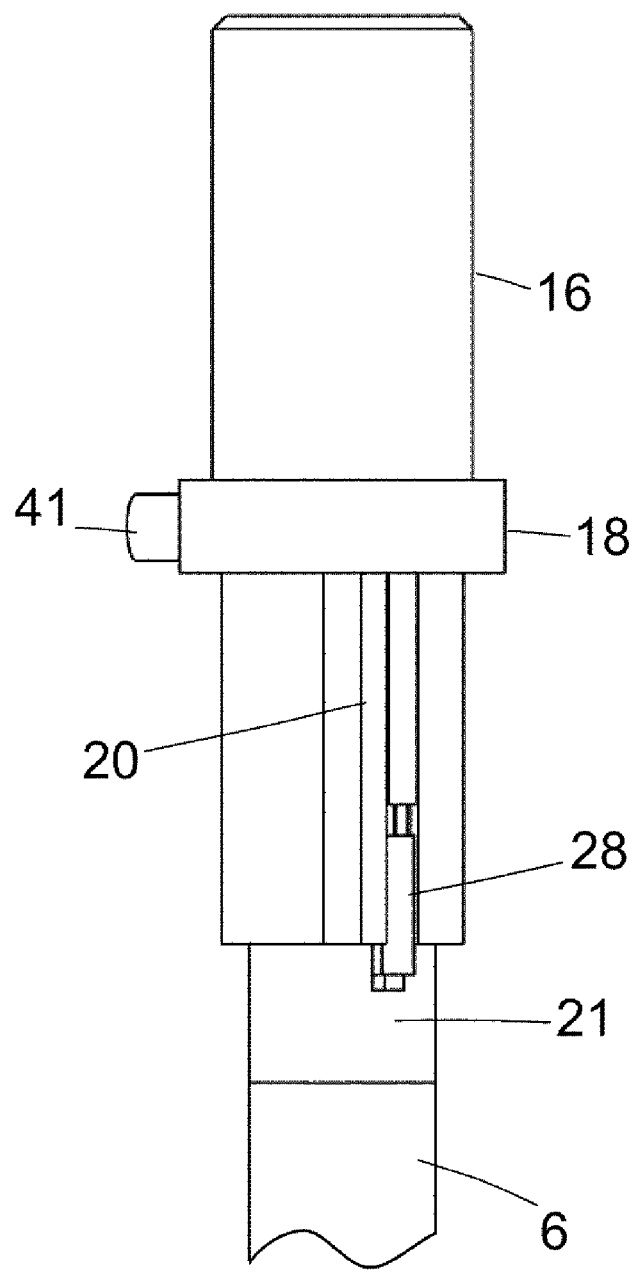
FIG. 14 is a side view of the gripper trigger mechanism.

The gripper trigger 28 is shown in FIGS. 13B and 14A in its retracted position which corresponds to the gripper arms 25 being open. It is shown in its extended position in FIGS. 13C and 14B which corresponds to the gripper arms 25 being closed.

Buffer Spring

The buffer spring 26 is shown in FIGS. 16 and 16A. It is located at the bottom of, and in the inside of, the upper tube 4 and fits around the lower tube 6. It absorbs the shock of the downward moving lower tube 6. In addition, its interaction with the gripper trigger 21 allows the gripper arms 25 to open: when the lower tube 6 is pushed down (for example because the trigger 2 has been pulled by the user) the protuberance 28 on the gripper trigger 21 makes contact with, and is pushed upward by, the buffer spring 26. This causes the gripper rod 23 to slide up with respect the lower tube 6 and the gripper arms 25 to open. Thus when the user pulls the trigger 2, the ball 32 is propelled by the movement of the lower tube 6. At the end of the motion of the lower tube 6, the gripper trigger 21 makes contact with the buffer spring 26, the gripper arms 25 open up and the ball 32 is released.

Gripper Shroud

The gripper shroud 27 is mounted at the bottom end of the lower tube 6 and surrounds and protects the gripper arms 25. It is made of strong hard plastic or metal material allowing the user to lean on the handle 1 when walking or to provide resistance when the handle 1 is pushed down to grab the ball 32.

The purpose of the gripping apparatus is to grab and release the ball at the right time. It is designed such that a small distance such as a couple of millimeters downward movement of the handle 1 (lock knob 8 must be un-tightened) causes the gripping arms 25 to completely close. Once the gripping arms 25 hug the ball pushing the handle 1 further down will not cause tighter grabbing. Accordingly, the ball 32 is grabbed the same way whether the user wants to project the ball 32 near or far away. The gripping apparatus 9 is also designed to release the ball 32 just at the right time before the main spring 5 is totally decompressed.

Operation of the Device

Figure 21:
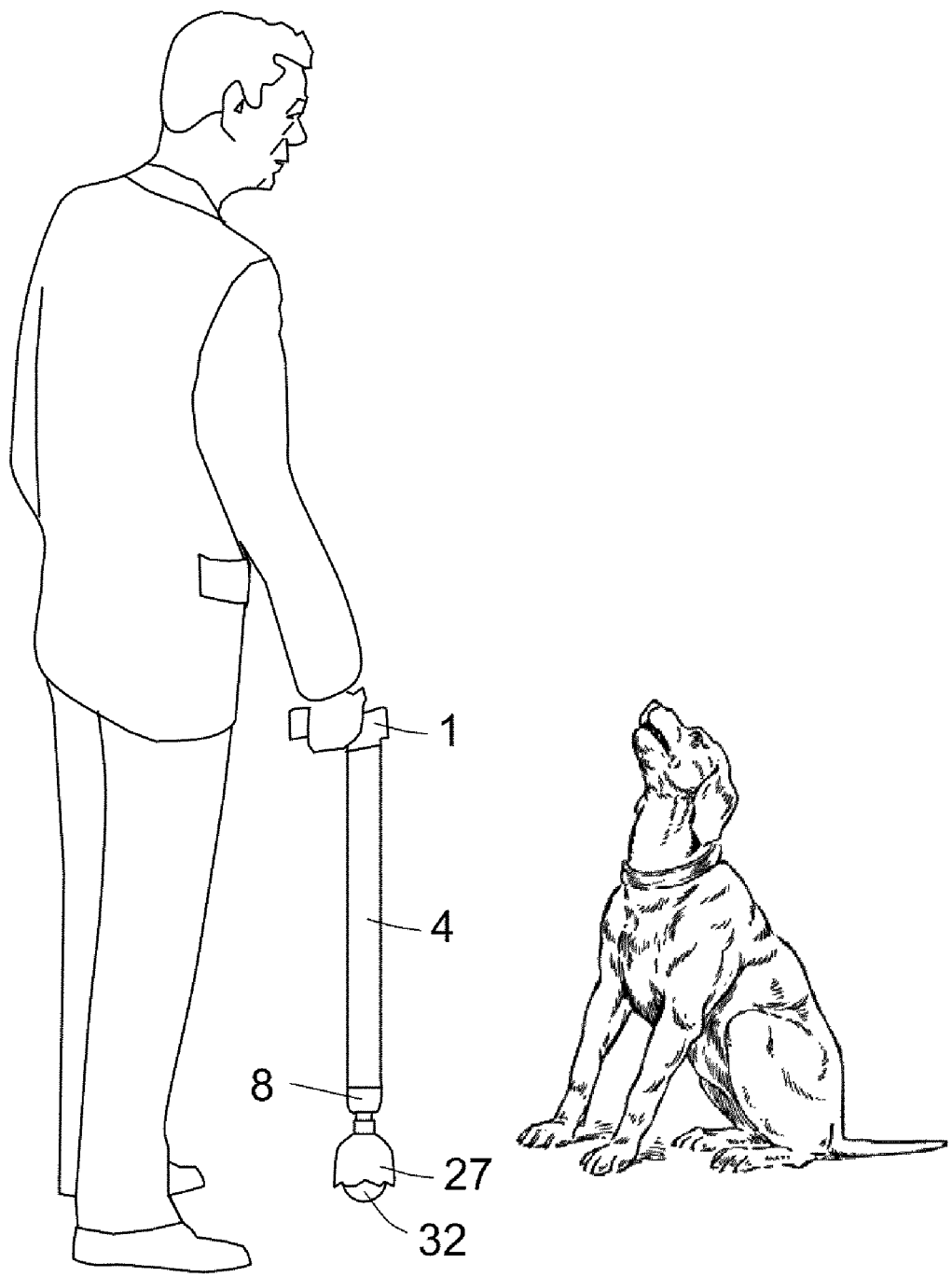
FIG. 21 illustrates a user of the device arming the device.
Figure 22:
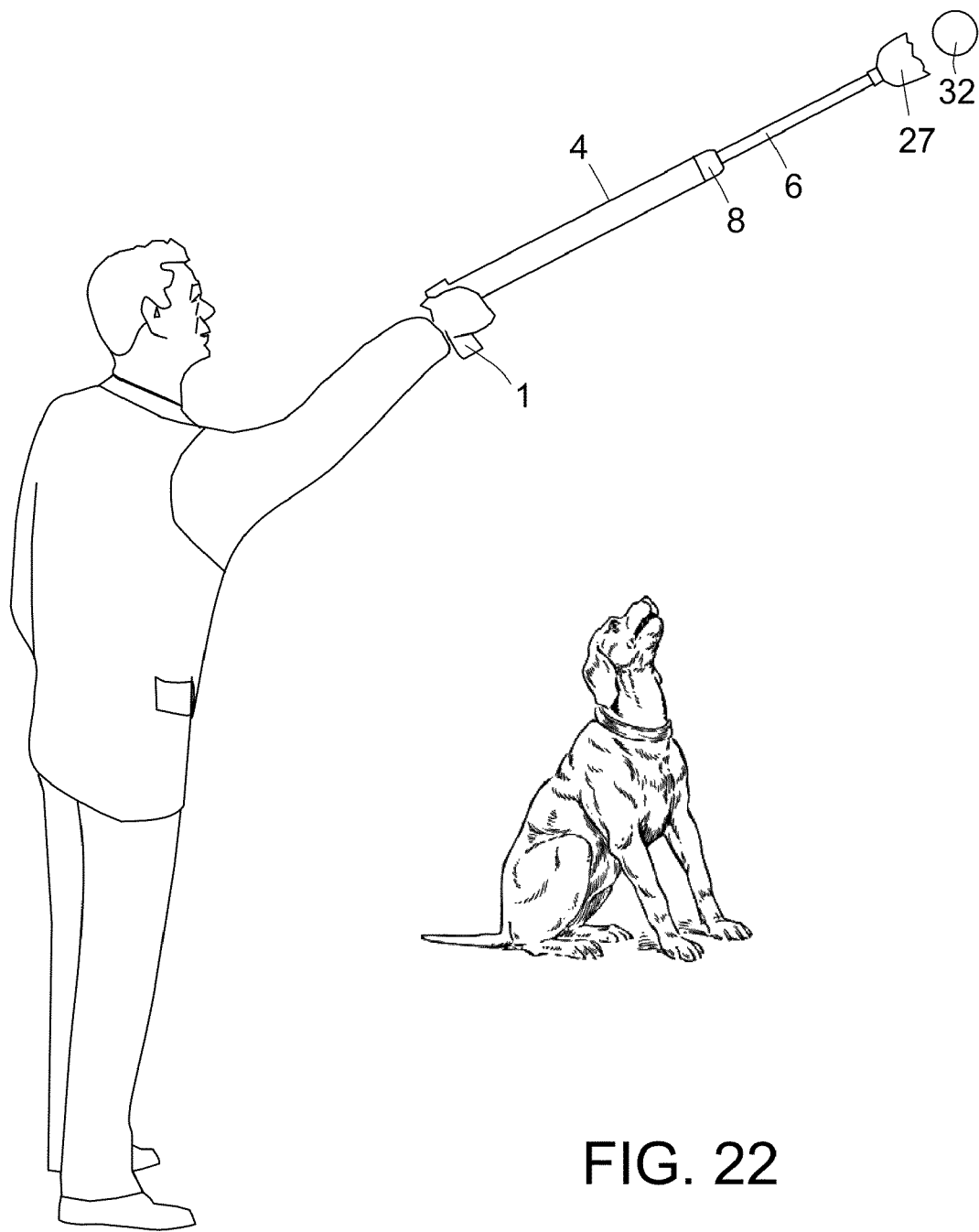
FIG. 22 shows a user of the device shooting a ball with the device.

Operation of the device is shown in FIGS. 21 and 22. Arming the device means that it will be put into the following state: the ball 32 is grabbed by the gripping arms 25, the main spring 5 is compressed, and the trigger ratchet 7 is engaged. All the user has to do is to aim the device and pull the trigger 2 to launch the ball 32. The locking knob 8 must be un-tightened and the safety lock bar must be unlocked to be able to arm the device.

Arming the Device

In the unarmed state illustrated in FIG. 16A, the main spring 5 is un-compressed and the lower tube 6 is pushed down into its bottom-most position. The gripper trigger 21 is in contact with, and pushed up by, the buffer spring 26, thereby pushing up the gripper rod 23 and forcing the gripping arms 25 to open. In the unarmed position the gripping arms 25 can be placed around the ball 32.

Figure 17:
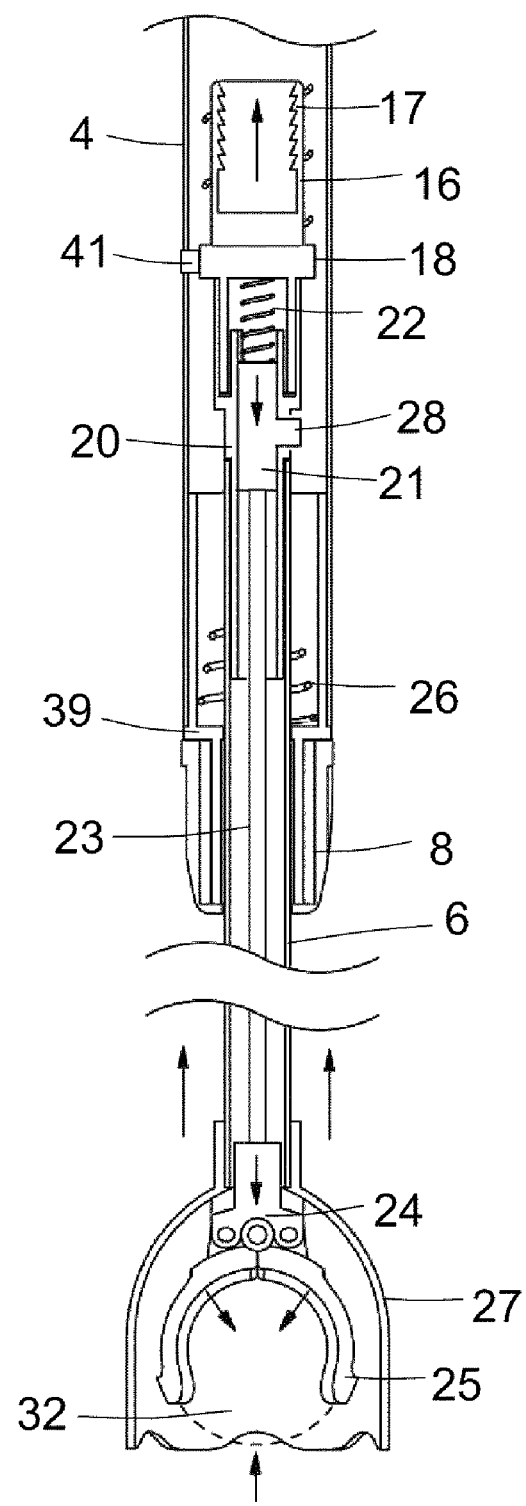
FIG. 17 is a cross-sectional view of the gripping mechanism showing the gripping arms in a grabbing position.

As shown in FIG. 17 and FIG. 21, when the user places the bottom of the device around a ball 32 on the ground and presses down the handle 1, the upper tube 4 moves downward relative to the lower tube 6 thus compressing the main spring 5. At the same time the gripper trigger 21 moves away from the buffer spring 26. When the buffer spring 26 can no longer push the gripper trigger 21 upward, the gripper spring 22 pushes down the gripper rod 23 causing the gripping arms 25 to close and to grab the ball 32.

The main spring 5 gets compressed in accordance with how far the handle 1 is pushed down. The serrated fork 14 also moves downward rubbing against the serrated tube 16 of the trigger ratchet mechanism 7. When the user stops pushing down the handle 1, the serrated sides get locked into each other. Now the device is armed. The user can also arm the device by pulling the trigger 2 while pushing down the handle 1. In this fashion the ratchet mechanism 7 does not operate until the user releases the trigger 2 thus locking the device in armed mode. When the device is armed the gripper arms 25 close because the gripper trigger 21 moves away from the buffer spring 26 when the handle 1 is pushed down.

Releasing the Trigger

Figure 18:
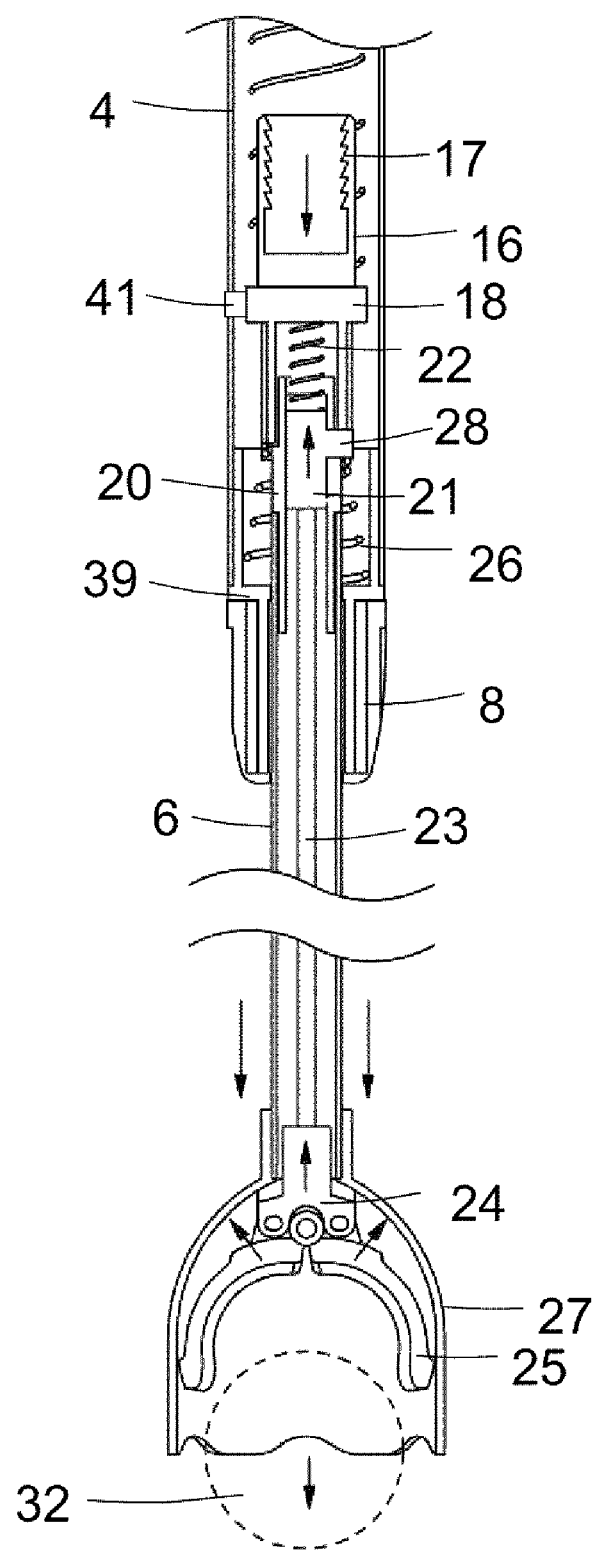
FIG. 18 is a cross-sectional view of the gripping mechanism showing the gripping arms in a releasing position.
Figure 20:
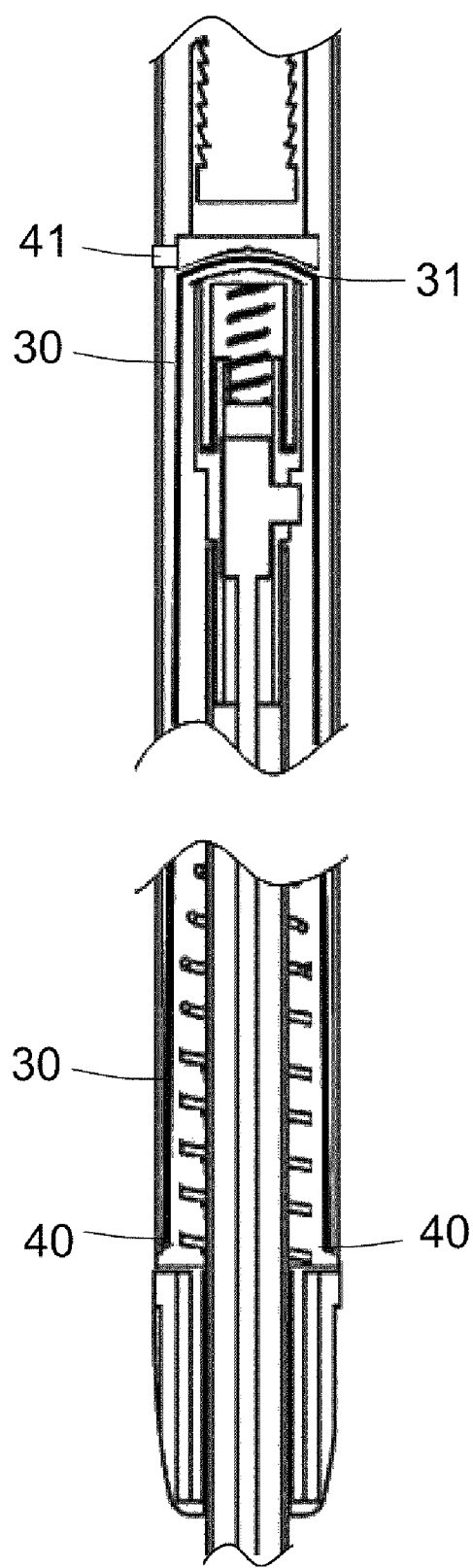
FIG. 20 is a close up image illustrating the rubber band that replaces the main spring.

The action resulting from releasing the trigger is illustrated in FIG. 18 and FIG. 22. The safety lock bar 3 must be pushed in from the top to allow the trigger 2 to be pulled. When the trigger 2 is pulled the serrated fork 14 is pulled away from the serrated tube 16 of the trigger mechanism by the branches of the trigger wire 13 connected to the trigger 2. If the lock knob 8 is un-tightened and the end of the device is unobstructed, meaning that the shroud 27 is not pressed against something firm like the ground, then the main spring 5 pushes the lower tube assembly 33 outward. As the lower tube assembly 33 slides outward, the gripper trigger 21 reaches the buffer spring 26 shortly before the lower tube assembly 33 reaches the end of its slide. As the main spring 5 keeps pushing the lower assembly 33 outward, the buffer spring 26 pushes the protuberance 28 in the gripper trigger 21 in the opposite direction. Consequently, the gripper trigger 21 pulls the gripper rod 23 upward, forcing the gripper arms 25 to open and to release the ball 32. In practice, just a few millimeters movement of the gripper rod 23 can be amplified by the leverage action of the gripper articulation 24 and is sufficient to open the gripper arms 25.

The buffer spring 26 has another role as well. It prevents the lower tube assembly 33 from slamming too hard into the upper tube end cap 34, protecting the device from damage after repeated use.

Unarming Without Shooting

The device can be unarmed without shooting the ball 32. The safety lock bar 3 must be pressed in from the top to allow the trigger 2 to be pulled. Also, the lock knob 8 must be un-tightened. The user can now unarm the device by holding the device by the handle 1 and pushing it down against something firm like the ground. The user then pulls the trigger 2 and allows the main spring 5 to get slowly uncompressed by slowly raising the handle 1. As the main spring 5 gets uncompressed, the lower tube assembly 33 moves outward relative to the upper tube 4. As the gripper trigger 21 reaches the buffer spring, it is pushed upward by the buffer spring 26, pulling the gripper rod 23 upward. A few millimeters movement are sufficient to allow the gripper arms 25 to open and release the ball 32.

Sling Shot Mechanism

As an alternative design, this invention could use a sling type mechanism instead of the main spring to provide the energy to launch the ball. As shown in FIG. 19 and FIG. 19A, and in the close up image shown in FIG. 20, a strong elastic cord 30 (or several cords for more power) could be attached to the lower inside section 40 of the upper tube 4. The cord would pass through a hole 31 in the end cap 18 for the lower tube. When the handle 1 is pushed down the lower tube assembly 33 moves upward relative to the upper tube 4 and stretches the cord. The operation of the rest of the device remains unchanged. After pulling the trigger 2 the elastic cord 30 pushes the lower tube assembly 33 outward. The gripping apparatus remains unchanged. In contrast with the spring, the rubber band in a stretched state corresponds to the spring in a compressed state, and the rubber band in a contracted state corresponds to the spring in a released state.

As yet another alternative the main spring and the elastic band could be included together in the device to provide more launching energy for the ball.

As is evident to a person having skill in the art, it is possible to replace the main spring mechanism by a compressed air mechanism for propelling the ball.

When used as a walking cane, the length of the cane can be adjusted by extending the lower tube outside of the upper tube by a desired amount and then locking the lower tube in place by means of the lock knob.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

We claim:

1. A ball launching device, comprising:
   a) a handle;
   b) an upper tube attached to said handle and terminated at its upper end by a first end cap called upper tube end cap;
   c) a lower tube slidably inserted into said upper tube, said lower tube being terminated at its upper end by a second end cap called lower tube end cap;
   d) a mechanical energy storage device located inside said upper tube between said upper tube end cap and said lower tube end cap, said mechanical energy storage device exerting a force on said lower tube when it is compressed;
   e) a gripping apparatus affixed to lower end of said lower tube, said gripping apparatus configured to switch between two possible states, a closed state and an open state, said closed state being enabled when said lower tube is partially or fully inserted into said upper tube, thereby allowing said gripping apparatus to hold said ball, and said open state being enabled when said lower tube is extended out of said upper tube, thereby allowing said gripping apparatus to release said ball; and
   f) a trigger mechanism, said trigger mechanism, when in a cocked state, allowing said mechanical energy storage device to remain compressed and, when released, allowing said mechanical energy storage device to expand, thereby extending in a telescoping fashion said lower tube outward of said upper tube and furthermore thereby, launching said ball, said trigger mechanism comprising:
      i) a trigger cavity formed inside said handle;
      ii) a trigger slidably located in said trigger cavity, said handle configured with openings to allow access to said trigger;
      iii) a trigger ratchet mechanism comprising:
         1. a ratchet fork attached at its base to said upper tube end cap, and carrying on the external surface of its tines serrated teeth, said ratchet fork consisting of springy flexible material;
         2. a ratchet tube carrying serrated teeth on its inside surface, said ratchet fork and ratchet tube forming a ratchet mechanism;
         3. a annular opening within said upper tube end cap;
         4. a tension wire in an inverted Y shape having a trunk at the top and two branches at the bottom;
      iv) said ratchet mechanism being controlled by said tension wire, top of said trunk of said Y being connected to said trigger through said annular opening in said upper tube end cap, and bottom of each said branch of said Y being connected to said ratchet fork structure, such that tension applied on said tension wire causes said ratchet fork to separate from said ratchet tube and release said ratchet trigger mechanism.

2. The ball launching device of claim 1 wherein said mechanical energy storage device comprises a metal spring.

3. The ball launching device of claim 1 wherein said mechanical energy storage device is a rubber band, said mechanical storage device being in a compressed state when said rubber band is in a stretched state, and said mechanical storage device being in a released state when said rubber band is in an unstretched state.

4. The ball launching device of claim 1 configured as a walking cane.

5. The ball launching device of claim 4 also comprising a lock knob attached to lower end of said upper tube, said lock knob having at least two configurations, first said configuration being such that said lock knob exerts no pressure on said lower tube thereby allowing said device to be used as a ball launcher, and second configuration being such that said lock knob exerts a locking pressure on said lower tube thereby allowing said device to be used as a walking cane.

6. The ball launching device of claim 1 wherein said gripping apparatus comprises:
   a) a mostly tubular gripper slide anchored at its upper end to said lower tube end cap;
   b) a mostly cylindrical gripper trigger that fits inside said gripper slide, said gripper trigger equipped on its side with a protuberance which projects through an opening in said gripper slide;
   c) a gripper rod embedded at its upper part in said gripper trigger, and being capable of sliding up or down inside said lower tube;
   d) a gripper articulation affixed at its upper end to said gripper rod, and to said lower tube, thereby providing leverage as a function of the position of said gripper rod with respect to said lower tube;
   e) gripper arms attached to said gripper articulation, position of said gripper arms dependent of said leverage provided by said gripper articulation;
   f) a buffer spring configured to absorb the shock of said lower tube as well as to press upward against said protuberance of said gripper trigger as said lower tube is extended downward;
   g) a gripper spring located between said lower tube end cap and said gripper trigger, said spring pushing down on said gripper rod thereby forcing said grippers arms to close and hold said ball, except when said lower tube is slid outward such that said protuberance in said gripper trigger makes contact with said buffer spring thereby countering said gripper spring and forcing said gripper rod to slide upward and force the gripper arms to open and release said ball.

7. The ball launching device of claim 6 also comprising a gripper shroud mounted at the bottom end of said lower tube said gripper shroud thereby shielding in part said gripper arms.

8. The ball launching device of claim 6 also comprising a guiding pin mounted on said lower tube end cap, said guiding pin sliding along a slot formed along the axial direction, on the surface of said upper tube, thereby preventing rotation of said lower tube within said upper tube.

* * * * *